US012268267B1

(12) United States Patent
Salvino et al.

(10) Patent No.: US 12,268,267 B1
(45) Date of Patent: Apr. 8, 2025

(54) DUST MITIGATION HEADGEAR

(71) Applicants: Chris Salvino, Scottsdale, AZ (US); Andrew Dummer, Chapel Hill, NC (US); Paul A Beatty, Fort Collins, CO (US)

(72) Inventors: Chris Salvino, Scottsdale, AZ (US); Andrew Dummer, Chapel Hill, NC (US); Paul A Beatty, Fort Collins, CO (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 18/932,726

(22) Filed: Oct. 31, 2024

(51) Int. Cl.

| | |
|---|---|
| ***A42B 3/28*** | (2006.01) |
| ***A41D 13/002*** | (2006.01) |
| ***A62B 18/00*** | (2006.01) |
| ***A62B 18/04*** | (2006.01) |

(52) U.S. Cl.
CPC .............. *A42B 3/28* (2013.01); *A41D 13/002* (2013.01); *A62B 18/003* (2013.01); *A62B 18/045* (2013.01)

(58) Field of Classification Search
CPC .... A62B 18/00-006; A62B 18/04-045; A62B 18/08; A62B 18/088; A62B 17/00; A62B 17/005; A62B 23/00-02; A62B 7/10; A42B 3/28-286; A41D 13/002-0025
See application file for complete search history.

(56) References Cited

U.S. PATENT DOCUMENTS

| | | | | |
|---|---|---|---|---|
| 3,736,927 | A * | 6/1973 | Misaqi | A62B 18/006 128/201.25 |
| 6,598,236 | B1 | 7/2003 | Gantt | |
| 2013/0340974 | A1 | 12/2013 | Billen | |
| 2018/0064199 | A1 | 3/2018 | Battis et al. | |
| 2022/0062664 | A1* | 3/2022 | Yuen | B03C 3/08 |
| 2022/0080227 | A1* | 3/2022 | Cohen | A62B 9/00 |
| 2022/0331619 | A1* | 10/2022 | Joseph | A62B 7/10 |
| 2023/0191169 | A1* | 6/2023 | Mestemacher | A62B 18/08 128/858 |

* cited by examiner

*Primary Examiner* — Rachel T Sippel
(74) *Attorney, Agent, or Firm* — Kenneth Altshuler

(57) ABSTRACT

Described herein are embodiments directed to a particle repelling helmet having particle mitigation system that keeps dust particles from going into the interior of the helmet. The helmet comprises a face vent that provides an unobstructed pathway between an external environment and a wearer's eyes, nose and mouth. A spacer arrangement connected to an inner side of the helmet provides a channel between the wearer's head and the inner helmet side. A fan blows air through the helmet, across the wearer's head and out the face vent and head receiving opening in the bottom of the helmet. Electrodes disposed along the edge of the face vent produce an electrostatic barrier that spans the face vent thereby further preventing charged dust from going into the helmet. The helmet can also comprise an ionizer that generates ions, which charges neutral dust particles that can be blocked by the barrier.

20 Claims, 14 Drawing Sheets

200

DUST MITIGATION HEADGEAR

CROSS-REFERENCE TO RELATED APPLICATIONS

None.

BACKGROUND OF THE INVENTION

1. Field of the Invention

The present invention relates generally to headgear that provides an internal low dust environment.

2. Description of Related Art

Lunar dust presents significant challenges to human health and equipment due to its small particle size, electrostatic charge, and presence of ferromagnetic materials. The low gravity on the Moon (⅙th of Earth's gravity) allows dust to remain suspended longer, posing inhalation risks and potential damage to the human respiratory system. Effective dust mitigation is essential for ensuring the safety and health of astronauts within lunar habitats.

Particles less than 0.1 micrometers (μm) are known to enter the bloodstream via the respiratory system. Most lunar dust ranges from 0.1 to 50 μm in size, with the majority less than 10 μm. This information underscores the importance of focusing on mitigation techniques, as not only is the respiratory system vulnerable, but the entire body via the blood. Lunar dust particles that are less than 50 μm adhere to surfaces mainly through electrostatic attractions, while the more abundant particles less than 50 μm adhere via van der Waals forces. However, unlike Earth, the lunar atmosphere is constantly charged, affecting dust of all sizes and making electrostatic charging the main force in dust adhesion independent of size.

Additionally, airborne dust on Earth, such as in mining and construction sites, face significant challenges. Particulate matter generated by excavation, drilling, and heavy machinery can lead to serious health concerns, including respiratory conditions like silicosis, pneumoconiosis, and chronic obstructive pulmonary disease (COPD). Additionally, dust can damage equipment, reduce visibility, and increase operational costs due to frequent maintenance. Moreover, like the problems in a lunar environment, dust particles here on Earth, pose risks due to their abrasive nature and ability to be inhaled deeply into the lungs.

The subject matter disclosed herein is generally directed to innovations related to managing dust particles from entering human lungs.

SUMMARY OF THE INVENTION

The present invention generally relates to headgear, such as a helmet, that discourages dust particles from entering therein thus protecting a headgear wearer's respiratory system.

In that light, certain embodiments of the present invention envision a particle repelling helmet that generally comprises an outer shell with a face vent and particle mitigation system that keeps dust particles from going into the interior of the helmet to protect the human respiratory system. The outer shell is configured to conform to a substantial part of a wearer's head, except for their face. The face vent is in the front of the helmet and is defined along boarders that include a forehead lip, a left and a right face vent periphery. The face vent is configured to provide an unobstructed pathway between an external environment and a wearer's eyes, nose and mouth. The particle repelling helmet further comprises a spacer arrangement, a positive pressure air source and electrodes disposed at the face vent peripheries. The spacer arrangement is connected to an inner side of the particle repelling helmet, wherein the spacer arrangement is configured to provide a channel between a wearer's head and the inner side. The positive pressure air source is in communication with the channel, the positive pressure air source is located at a back side of the particle repelling helmet. The positive pressure air is filtered, and in some embodiments, charged to induce charged particles outside of the helmet. The positive pressure air source is configured to exit airflow through the face vent via the channel. The electrodes are configured to produce an electrostatic field that spans the face vent that repel charged particles outside of the helmet.

Another embodiment of the present invention envisions a helmet that is configured to receive a human head. The helmet comprising a head interfacing interior and an exterior (that interfaces an external environment) having a front side, a rear side, and a perimeter lip, and, which defines a face vent and a head receiving aperture. The head receiving aperture is configured to receive a human head. The face vent is defined between a left and a right cheek perimeter lip and of the perimeter lip and a brim that extends from a forehead region of the front side. The face vent is configured to provide an unobstructed path between an external environment and a wearer's eyes, nose and mouth. The helmet further comprises a spacer arrangement, a positive pressure air source and electrodes. The spacer arrangement is connected to the helmet inner side and is configured to provide a channel between a wearer's head and the helmet inner side. The positive pressure air source is in communication with the channel at the rear side. The positive pressure air source is configured to exit airflow through the face vent via the channel. The electrodes are disposed at the left and the right cheek perimeter lip, wherein the electrodes are configured to produce an electrostatic field that spans the face vent.

Yet another embodiment of the present invention envisions a dust repelling helmet that comprises a spacer arrangement, a positive pressure air source, and electrodes. The dust repelling helmet possesses an inner surface and an exterior surface that defines a front side, a rear side, and a face vent. The face vent is defined between a left perimeter, a right perimeter, and a brim that extends outwardly from a forehead region of the front side. The face vent is configured to provide an unobstructed path between an external environment and a wearer's eyes, nose and mouth. The spacer arrangement is located at the interior and is configured to provide a channel that is defined between a wearer's head and the inner surface. The positive pressure air source is envisioned to be in communication with the channel and is configured to flow airflow over the wearer's head and through the face vent via the channel. The electrodes are disposed at the left perimeter and the right perimeter, wherein the electrodes are configured to produce an electrostatic field that spans the face vent.

DETAILED DESCRIPTION

Figure 1A:
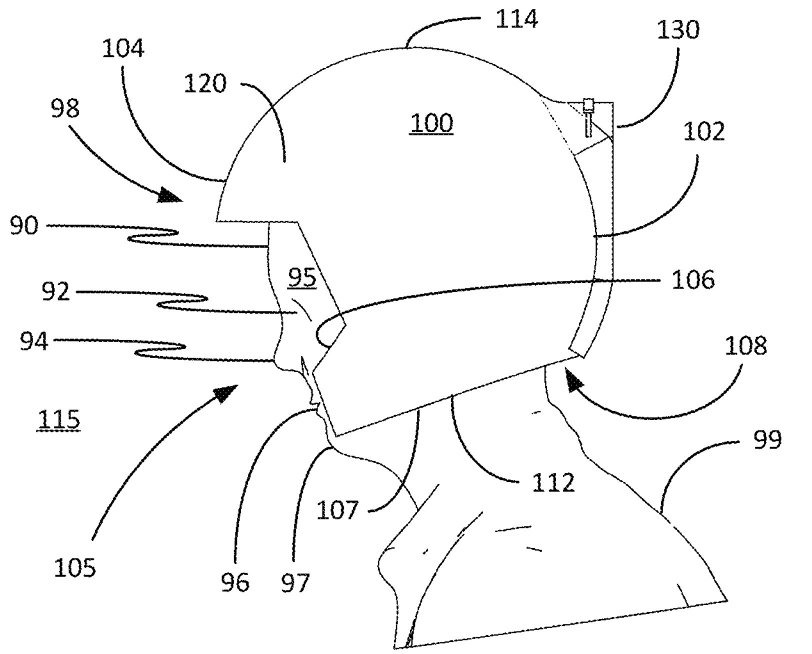
FIG. 1A is a line drawing illustratively depicting a person wearing particle repelling headgear consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phrases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/−value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to a particle repelling headgear that has a particle mitigation system that keeps dust particles from going into the interior of the headgear thereby protecting a wearer's respiratory system. To streamline the illustrative embodiments, the headgear will be described as a helmet. The helmet comprises a face vent that provides an unobstructed pathway between an external environment and a wearer's eyes, nose and mouth. A spacer arrangement connected to an inner side of the helmet provides a channel between the wearer's head and the inner helmet side. An air flow source, such as a fan, blows air through the helmet, across the wearer's head and out the face vent and head receiving opening in the bottom of the helmet. When energized, electrodes disposed along the edge of the face vent produce an electrostatic barrier that spans the face vent thereby further preventing charged dust from going into the helmet. The helmet can also comprise an ionizer that generates ions, which charges neutral dust particles that can be blocked by the barrier.

FIG. 1A is a line drawing illustratively depicting a person wearing particle repelling headgear, such as a helmet for example, consistent with embodiments of the present invention. The helmet described herein is a hard-shelled headgear but a soft or partially soft headgear that is not a helmet can comprise all the elements described herein without departing from the scope and spirit of the present invention. One advantage of a hard-shelled helmet is to protect a wearer's head from impact of external objects. A shaped foam headgear, for example, would offer less impact protection but could be lighter and easier to manage in an inside environment, such as a lunar shelter or lunar living space.

As shown, the particle repelling helmet 100, or simply helmet, is being worn by a person (wearer) 99. The helmet 100 is shaped to conform to a human/person's head 98, which is received (i.e., put on) via a head receiving aperture 108 defined by a head receiving lip 107 located along the bottom 112 of the helmet 100. The helmet's bottom 112, or in this example, a helmet bottom side 112, is opposite to the helmet apex/top 114. The helmet 100 comprises a face vent 105 that provides an unobstructed opening, or pathway, between an external environment 115 and the wearer's eyes 92, nose 94 and mouth 96. The face vent 105 is located at the helmet's front 104, just under a helmet forehead region 120, which is configured to interface the wearer's forehead 90. A face vent lip 106 defines the shape of the face vent 105, which extends towards the wearer's chin 97. In this embodiment, the face vent lip 106 is connected to, or otherwise continues into, the head receiving lip 107. The face vent 105 also provides an unobstructed view of the person's face 95 from an onlooker in front of or otherwise facing the wearer's face 95. A positive pressure inlet housing 130 is depicted extending from the back 102 of the helmet 100, which will be discussed later.

Figure 1B:
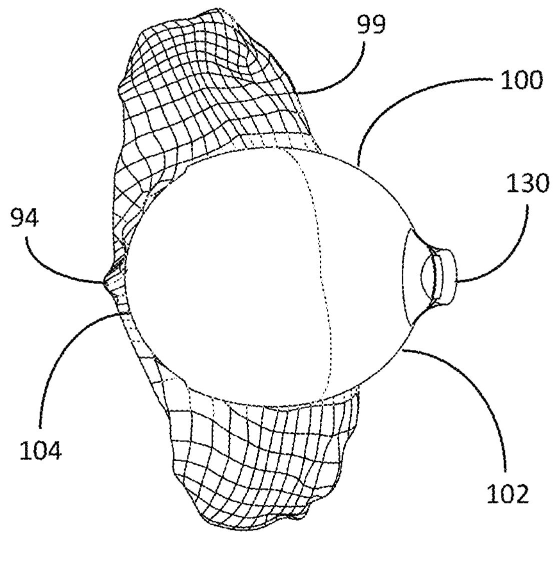
FIG. 1B is a line drawing illustratively depicting the person wearing the particle repelling helmet of FIG. 1A from a top-down view perspective.

FIG. 1B is a line drawing illustratively depicting the person 99 wearing the particle repelling helmet 100 of FIG. 1A from a top-down view perspective. From this perspective, the wearer's nose 94 is shown extending from the helmet's front 104. The positive pressure inlet housing 130 is shown extending from the helmet's rear 102.

Figure 1C:
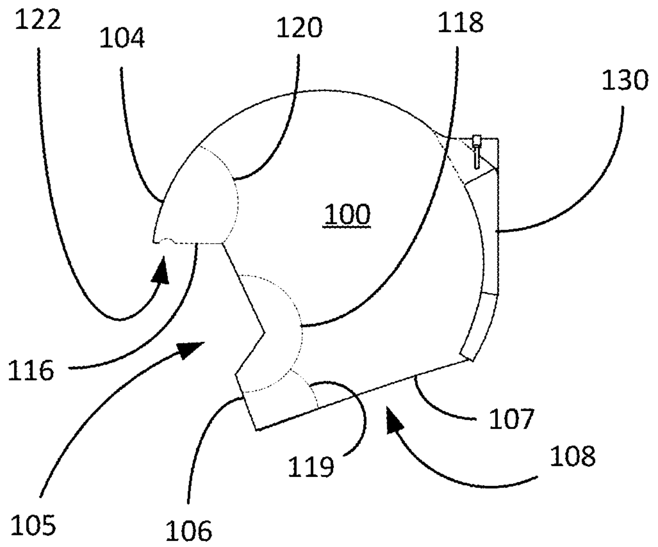
FIG. 1C is a side-view line drawing illustratively depicting the particle repelling helmet of FIG. 1A.

FIG. 1C is a side-view line drawing illustratively depicting the particle repelling helmet 100 of FIG. 1A devoid of a person wearing the helmet 100. The helmet 100 comprises a pair of cheek guards 118 that extend along the lower portion of the face vent lip 106. In this embodiment, the cheek guards 118 (a left and a right cheek guard) close in along the wearer's mouth 96 to reduce the size of the face vent 105 to increase the velocity of airflow 135 expelled from the helmet 100, as discussed in more detail below. A forehead underside lip 116 defined in the forehead region 120 can comprise a plurality of airflow exit ports 122. The brim underside can be part of the face vent lip 106. In certain embodiments, the face vent 105 can further include a chin region 119 that is envisioned to extend to or below a wearer's chin 97.

Figure 1D:
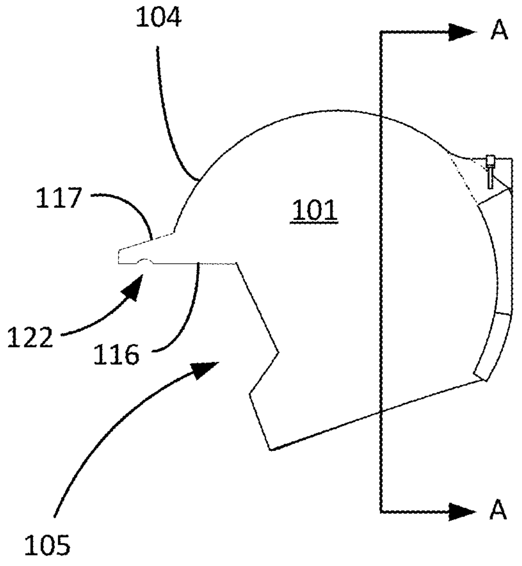
FIG. 1D illustratively depicts a slight variation of the helmet embodiment of FIG. 1C but with a brim consistent with embodiments of the present invention.

FIG. 1D illustratively depicts a slight variation of the helmet embodiment 100 of FIG. 1C but with a brim 117 extending from the front 104 of the helmet embodiment 101. As shown here, the airflow exit ports 122 are in the underside of the brim 117 beyond the forehead underside lip 116. In this way, airflow 135 can be made to flow downwards, like an air curtain, across the face vent 105, which may add a protective barrier to the likelihood of airborne dust entering the interior helmet space 110. Cross-section cut-line AA is presented for FIG. 1E.

Figure 1E:
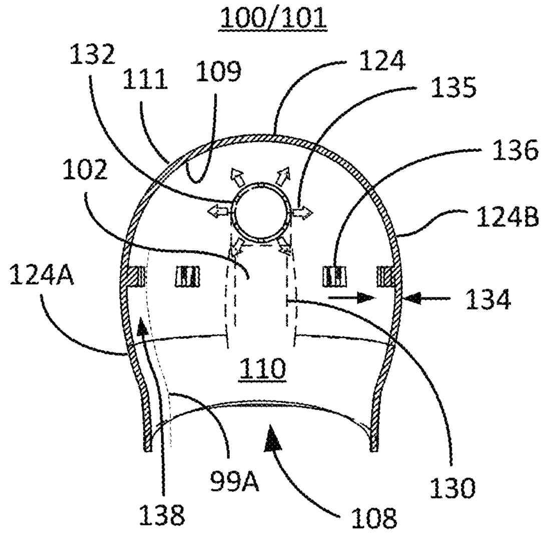
FIG. 1E is a line drawing of a cross-section along cut-line AA of FIG. 1D illustratively depicting an interior perspective of the particle repelling helmet looking towards the back of the helmet.

FIG. 1E is a line drawing of a cross-section along cut-line AA of FIG. 1D illustratively depicting an interior perspective of the particle repelling helmet looking towards the back 102 of the helmet 100/101. The helmet rear 102 is identical for both helmets 100 and 101 in this embodiment. The helmet shell 124, hashed to depict the cross-section, defines a helmet interior surface 109 and a helmet exterior surface 111. The helmet interior space 110, includes all that is in the helmet 100/101 minus the wearer's head 98. An inlet port 132, in the upper center of the helmet interior 110, receives pressurized air 135, which naturally flows (see airflow arrows) along an airflow channel 138, defined by the head-to-interior-surface spacing 134 created by the internal head support 136. The head-to-interior-surface spacing 134 is the spacing between a wearer's head 98 and the interior surface 109. The airflow channel 138 is depicted along the helmet interior surface 109 and the dashed line 99A, which is defined by the wearer 99. The internal head support 136 spaces the wearer's head 98 from the interior surface 109 for comfort, shock management, and the formation of the airflow channel 138. For reference, the right helmet side 124A and the left helmet side 124B of the helmet shell 124 are shown. Also, for reference, shown are the head receiving aperture helmet 108 and the hidden lines for the positive pressure inlet housing 130.

Figure 1F:
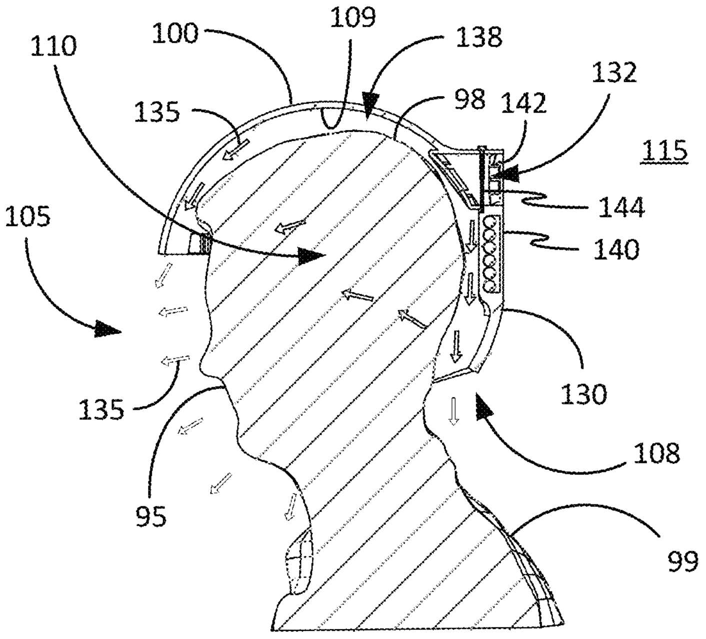
FIG. 1F is a cross-section side view line drawing of a wearer wearing the helmet embodiment of FIG. 1A.

FIG. 1F is a cross-section side view line drawing of a wearer 99 wearing the helmet embodiment 100 of FIG. 1A. As depicted, air 135 flows, through the airflow channel 138 via a fan arrangement 142, which pressurizes the air 135 on the channel side 138 of the fan 142. In this embodiment, the fan 142 is electrically powered by a battery pack 140 located under the fan 142. Both the fan 142 and battery pack 140 are disposed in the positive pressure inlet housing 130 but could just as easily be elsewhere. A filter 144, such as a HEPA (high efficiency particulate air) filter, is placed on the exit side of the fan 142 (towards the airflow channel 138) to filter debris or dust particles from entering in the helmet interior 110 via the external environment 115. Optional embodiments envision the filter 144 being disposed on the entry side of the fan 142 (towards the external environment 115). As shown, the airflow channel 138 is the space defined between the helmet's interior surface 109 and the wearer's head 98. Filtered airflow 135 is directed along the airflow channel 138 and out the face vent 105 and head receiving aperture 108 (see arrows 135) thereby preventing particulates from entering the helmet interior 110 via the external environment 115. The filtered air 135 that exits through the face vent 105 acts as an invisible barrier between the wearer's face 95 and the exterior environment 115. In this way, the wearer 99 can talk to someone, eat, touch their face 95, etc., all the while avoiding contaminated air in the external environment 115 from contaminating the interior space 110 and endangering the wearer's respiratory system. One further benefit of this arrangement is that the airflow 135 can further act as a convection cooling means for the wearer's head 98. In other words, if the wearer 99 is using the helmet 100 in an uncomfortably hot environment, the flowing air 135 can help transfer heat from the wearer's head 98 providing some additional comfort to the wearer 99.

Figure 1G:
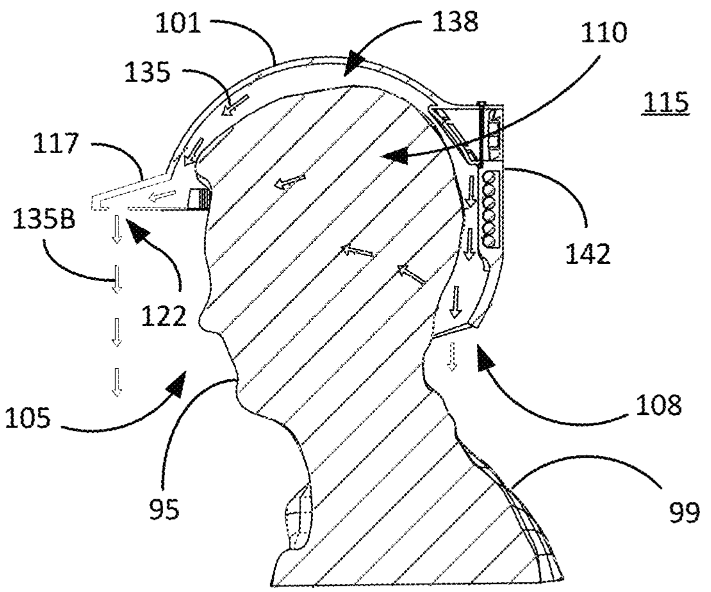
FIG. 1G is a cross-section side view line drawing of a wearer wearing the helmet embodiment of FIG. 1D.

FIG. 1G is a cross-section side view line drawing of a wearer 99 wearing the helmet embodiment 101 of FIG. 1D. As depicted, the fan arrangement 142 pressurizes the air 135 to flow through the airflow channel 138. The filtered air 135 flows along the airflow channel 138 and out the face vent 105 and head receiving aperture 108 (see arrows 135). Additionally, a curtain of airflow 135B is pressurized to move from the airflow exit ports 122 in the brim 117 over the face vent adding an additional barrier to the wearer's face 95 from dust particles in the external environment 115.

Figure 1H:
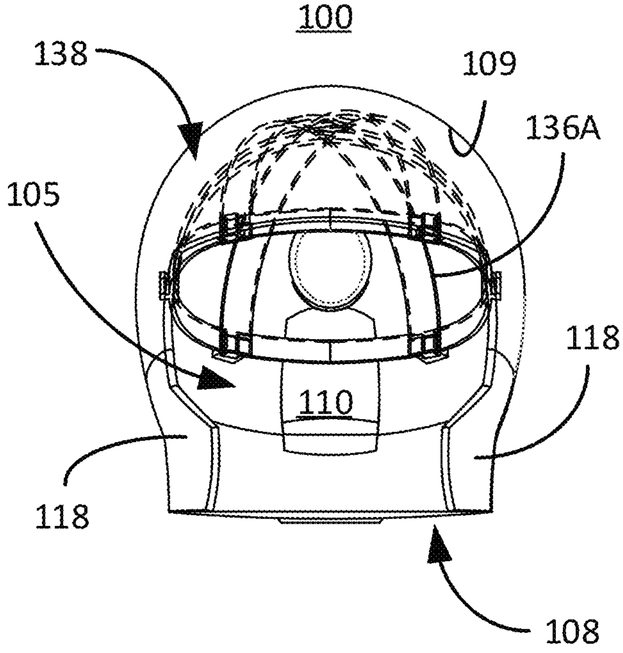
FIG. 1H is a front view line drawing of the helmet depicting an internal head support cage consistent with embodiments of the present invention.

FIG. 1H is a front view line drawing of the helmet 100 depicting an internal head support cage 136A consistent with embodiments of the present invention. As shown here, the internal head support cage 136A tightly conforms to the cranium of a wearer's head 98. The internal head support cage 136A is partly viewable via the face vent 105. The cheek guards 118 and head receiving aperture 108 are shown here for reference. The internal head support cage 136A illustratively depicts the airflow channel 138 between the internal head support cage 136A the interior surface 109. It should be appreciated that a skilled artisan would be able to design an optional internal head support cages 136A given the number of options currently in existence.

Figure 1I:
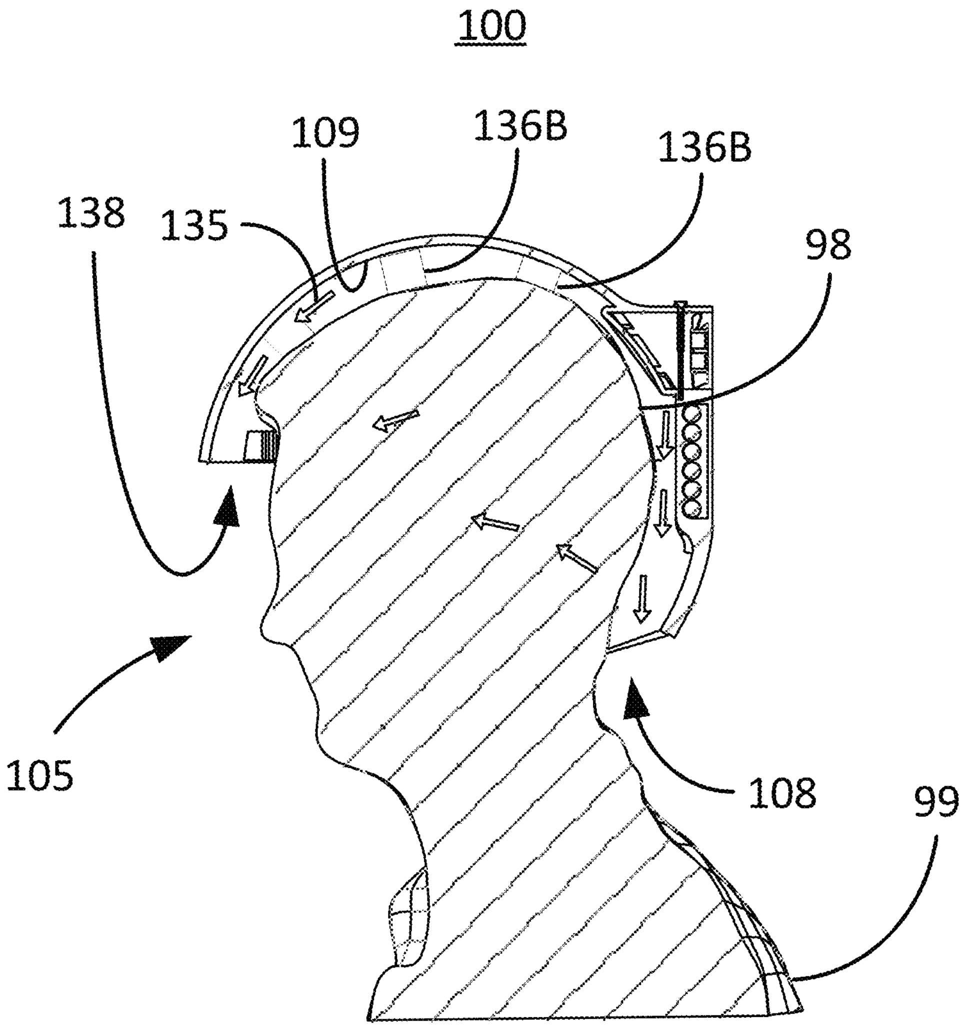
FIG. 1I is a side view cross-section line drawing of the helmet being worn by a person depicting an optional internal head support stays consistent with embodiments of the present invention.

FIG. 1I is a side view cross-section line drawing of the helmet 100 being worn by a person 99 depicting an optional internal head support stays 136B consistent with embodiments of the present invention. As shown here, the internal head support stays 136B extend from the interior surface 109 to contact the wearer's head 98. The head support stays 136B can be made from rubber or foam, for example, to tightly conforms to the cranium of a wearer's head 98. The internal head support stays 136A allow air 135 to flow through the airflow channel 138 and out through the face vent 105 and head receiving aperture 108. Air 135 will obviously flow around the head support stays 136B, unless the head support stays 136B are porous to allow air to sufficiently pass therethrough.

Figure 2A:
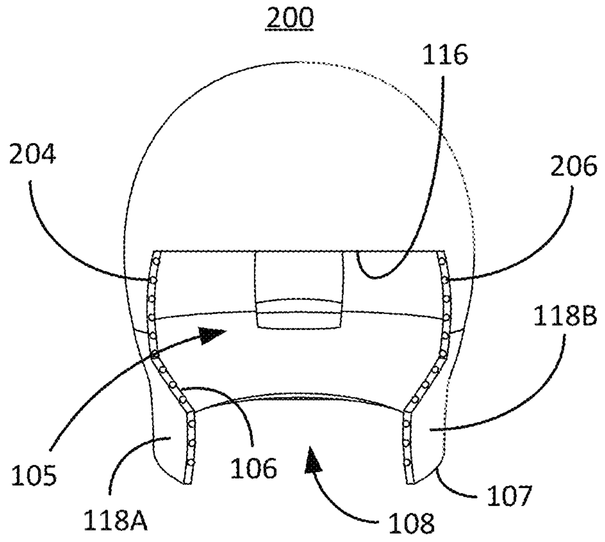
FIG. 2A-2E are line drawings of an electrostatic face vent barrier consistent with embodiments of the present invention.

FIG. 2A-2E are line drawings of an electrostatic face vent barrier consistent with embodiments of the present invention. FIG. 2A is a front view of the helmet embodiment 200, which is like that of the helmet embodiment 100 of FIG. 1A but with electrodes 204 and 206 dispersed along the face vent lip 106. The forehead lip 116 is devoid of electrodes in this embodiment. The electrodes 204 and 206 are shown evenly dispersed along the face vent lip 106 at the left cheek side 118A and the right cheek side 118B, respectively. Other embodiments allow for the electrodes 204 and 206 to be dispersed in an unevenly dispersed arrangement. When powered, the electrodes 204 and 206 form an electrostatic face vent barrier 215 extending over the face vent 105, as shown by the dashed lines in FIG. 2D. For reference, the head receiving lip 107 is contiguous with the face vent lip 106, the head receiving lip 107 defines the head receiving aperture helmet 108.

Figure 2B:
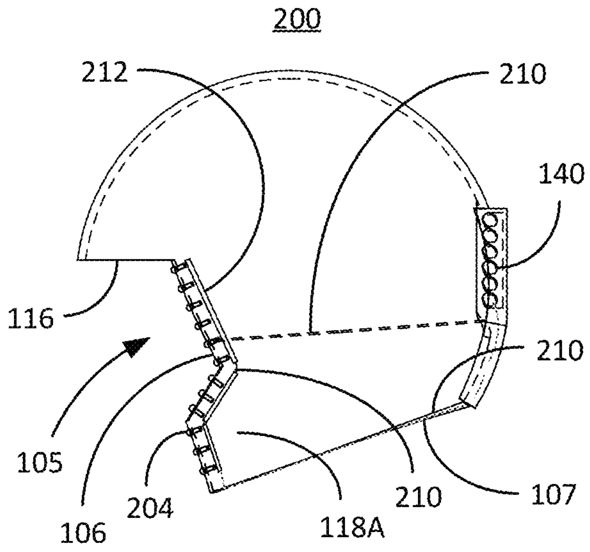

FIG. 2B illustratively depicts a cross-section side view of the helmet embodiment 200 of FIG. 2A consistent with embodiments of the present invention. As shown, the electrodes 204 are extending from the face vent lip 106 of the left cheek side 118A from the forehead underside lip 116 to the head receiving lip 107. The electrodes 204 are connected to the battery pack 140 via positive and negative electrode wire leads 210, shown by the dashed lines. The electrodes 204 are connected to a power busbar 212 that follows the shape of the face vent lip 106, as shown.

Figure 2C:
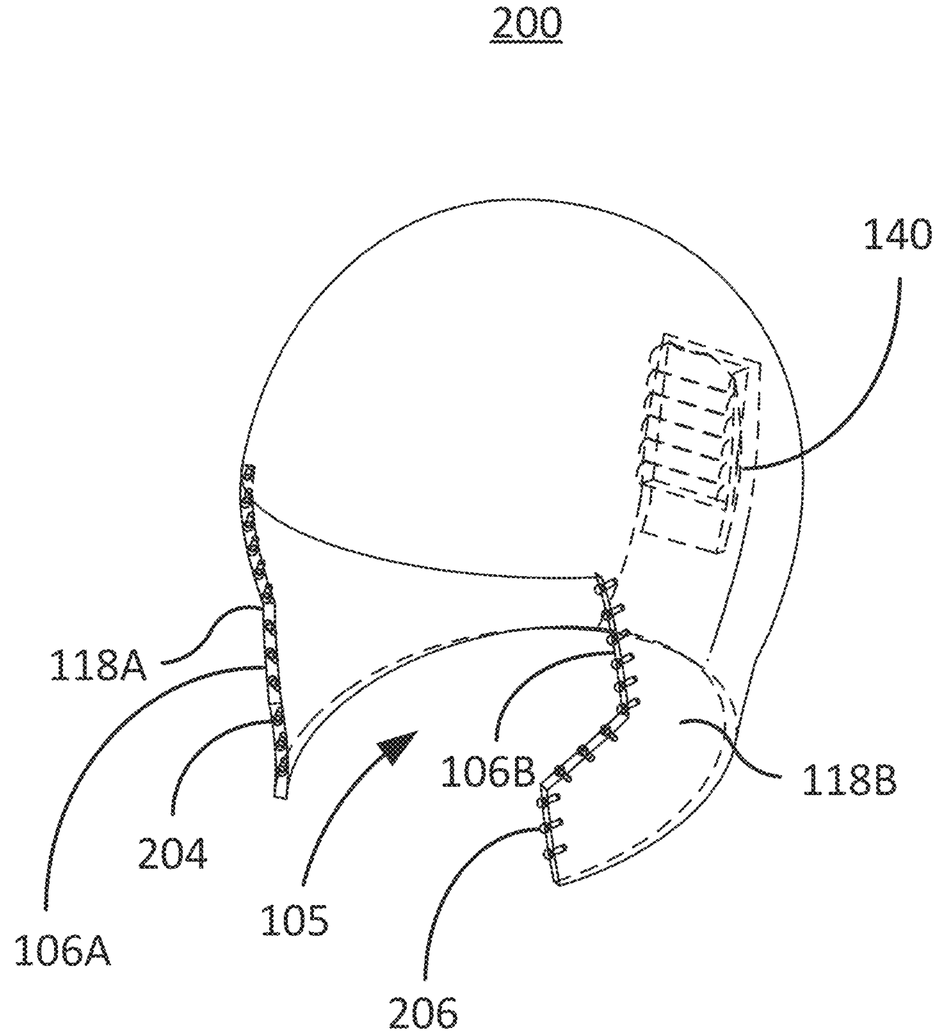

FIG. 2C illustratively depicts an angled view of the helmet embodiment 200 of FIG. 2A consistent with embodiments of the present invention. As shown, the left electrodes 204 extend from the left face vent lip 106A of the left cheek side 118A and the right electrodes 206 extend from the right face vent lip 106B of the right cheek side 118B. The left electrodes 204 possess a different electrostatic polarity than the right electrodes 206. For example, the left electrodes 204 can comprise a negative charge versus a positive charge for the right electrodes 206. Hidden lines of the battery pack 140 is shown here for reference.

Figure 2D:
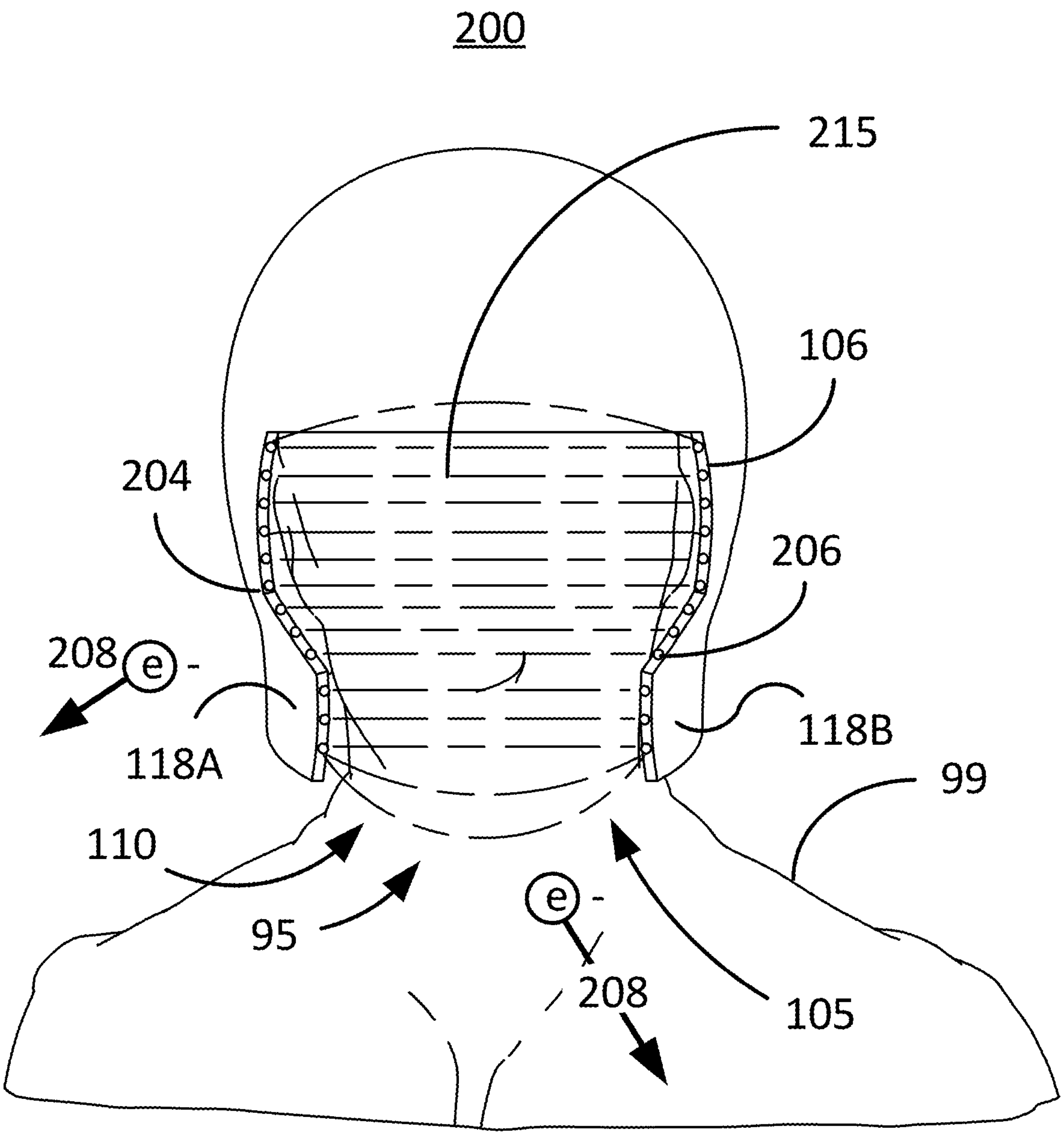

FIG. 2D is a front view of the helmet embodiment 200 being worn by a person 99 consistent with embodiments of the present invention. Here, the left electrodes 204 and corresponding right electrodes 206 are powered to generate the electrostatic field 215 acting as a face vent barrier depicted by the dashed lines. The electrostatic face vent barrier 215 spans, or otherwise extends, across the face vent 105 from the left cheek region 118A to the right cheek region 118B. In this way, charged particles 208 in the air are deflected by the electrostatic face vent barrier 215 thereby preventing the charged particles 208 from getting to the wearer's face 95. Because the charged particles 208 are repelled from crossing into the helmet interior 110 via the face vent 105, the wearer 99 is protected from breathing in the charged particles 208. The electrostatic field 215 in front of the face vent 105 can be a static field via a direct current being delivered to the electrodes 204 and 206. Another embodiment envisions the electrostatic field 215 in front of the face vent 105 can be an alternating electrostatic field generated by an alternating current being delivered to the electrodes 204 and 206. Other embodiments envision a combination of alternating current and direct current being applied to the electrodes 104 and 106 over select intervals (duty cycles), such as 2 milliseconds of direct current followed by 2 milliseconds of alternating current. The electrical circuit and associated components (not shown) that drive the electrostatic face vent barrier 215 can be arranged via standard electrical circuit design practices known to those skilled in the art.

Figure 2E:
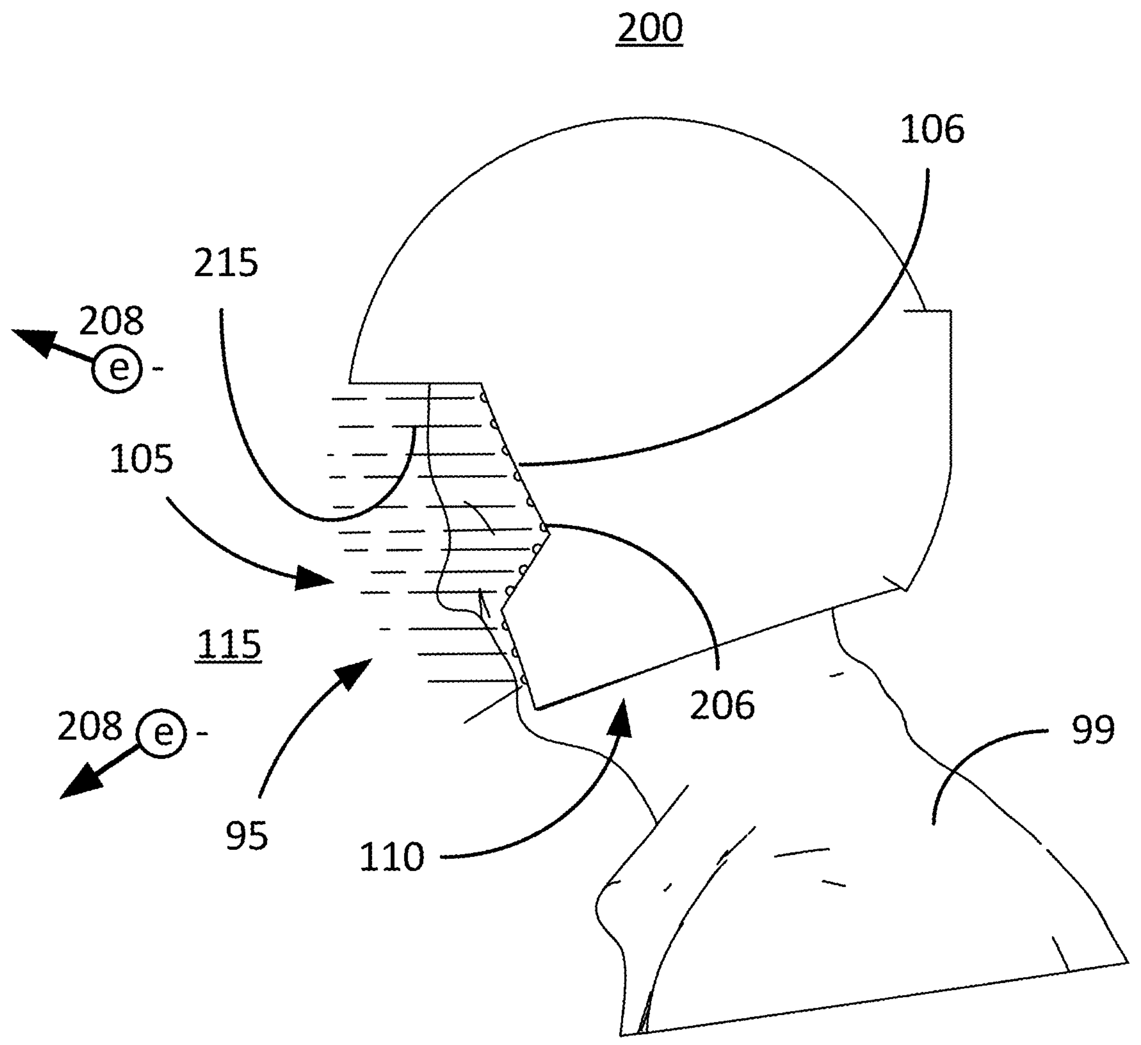

FIG. 2E is a side view of the helmet embodiment 200 being worn by a person 99 consistent with embodiments of the present invention. As shown, the electrostatic face vent barrier 215 extends in front of the wearer's face 95 serving to repel unwanted charged particles 208 from entering in the helmet interior 110 via the face vent 105. Accordingly, the electrostatic face vent barrier 215 protects the wearer 99 from breathing in charged particles 208 that may be suspended in the external environment 115.

Figure 3A:
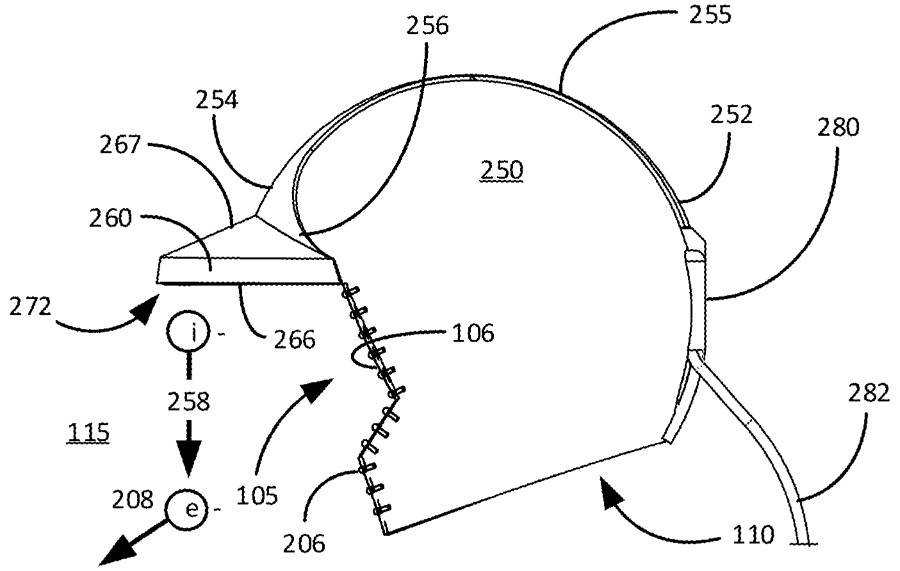
FIGS. 3A-3D are line drawings of an ionizer and electrostatic face vent barrier helmet embodiment consistent with embodiments of the present invention.

FIGS. 3A-3D are line drawings of an ionizer and electrostatic face vent barrier helmet embodiment consistent with embodiments of the present invention. FIG. 3A is a side view line drawing of the ionizer and electrostatic face vent barrier helmet embodiment 250 depicting an ionizer arrangement 280 used in conjunction with the electrostatic face vent barrier system described in conjunction with the helmet embodiment 200, of FIG. 2E. The ionizer arrangement 280, which is located at the back side 252 of the helmet 250, is configured to produce ions 258, which are dispensed, or otherwise emitted, from the helmet 250 via at least one ion exit port 272 located at the underside lip 266 of the brim 267. High voltage power is delivered to the ionizer arrangement 280 via the voltage power line 282. Ions 258 produced by the ionizer 280 are transmitted through an ion conduit 255 that comprises an inlet port 286 at the back side 252 of the helmet 250. The conduit 255 leads into a distributor 256 at the front side 254 of the helmet 250, which spreads the ions 258 along the front periphery 260 of the brim 267. When emitted, the ions 258 create a curtain-like geometry in front of the face vent 105. The curtain-like geometry of ions 258 dispensed from the ion exit port 272, traverse over the face vent 105, thereby charging uncharged dust particles 208 floating in the external environment 115 in front of the face vent 105. The charged dust particles 208 are repelled by the electrostatic face vent barrier (shield) 215 when the electrodes 206 and 204 are energized, as shown in FIG. 2E. In this way, uncharged particles in the air become charged particles 208. For reference, the right sided electrodes 206 extending from the face vent lip 106 are shown. As discussed above, the charged particles 208 are deflected by the electrostatic face vent barrier 215, which prevents the charged particles 208 from crossing into the helmet interior 110 via the face vent 105 thereby protecting the wearer 99 from breathing in dust contamination.

Figure 3B:
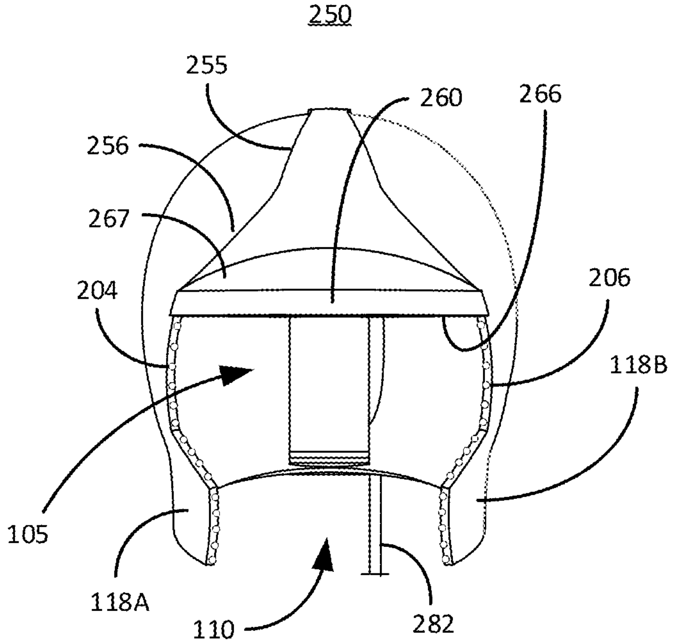

FIG. 3B is a line drawing viewing the front of the helmet 250. From this perspective, the ion conduit 255 is shown leading into the distributor 256, which feeds into the front periphery 260 of the brim 267. FIG. 3B is described in view of FIGS. 1G, 1F, 2E and 3A. As discussed above, ions 258 flowing outward from the underside lip 266 of the brim 267 charge dust particles 208 floating in the ambient environment 115 in front of the face vent 105. The charged dust particles 208 are deflected by the electrostatic face vent barrier 215 generated when the left and right electrodes 204 and 206 are energized. The combination of charging the particles 208 floating in the external environment 115 with the repulsive action of the electrostatic face vent barrier 215 serves to prevent the influx of particulate contamination (that may have originated as neutrally charged dust particles) from reaching the helmet's interior 110. Coupled with a filtered positive air pressure described in conjunction with FIGS. 1G and 1F, the helmet's interior volume 110 provides a clean environment for a wearer 99 to safely function in an otherwise dust contaminated environment.

Figure 3C:
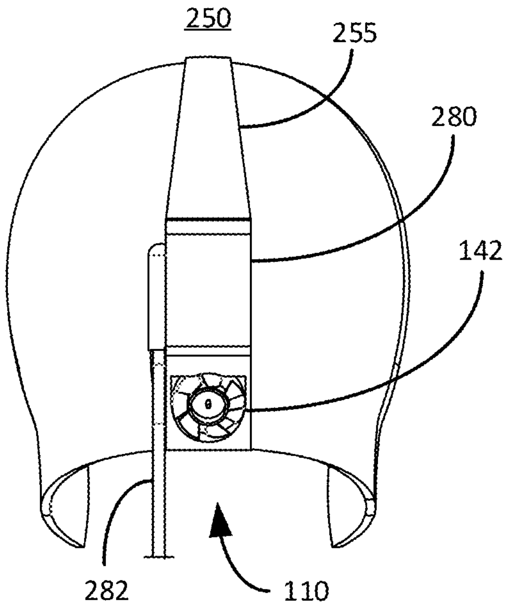

FIG. 3C is a back side view of the helmet 250 showing the ionizer arrangement 280, fan 142 and ion conduit 255 consistent with embodiments of the present invention. The fan arrangement 142 is used here to at least move or blow the ions 258 generated by the ionizer arrangement 280 through the ion conduit 255. The fan arrangement 142 can further be used to pressurize air 135 inside 110 of the helmet 250, as shown in FIG. 1E. The voltage power line 282, shown here for reference, can also supply power to the electrodes 204 and 206.

Figure 3D:
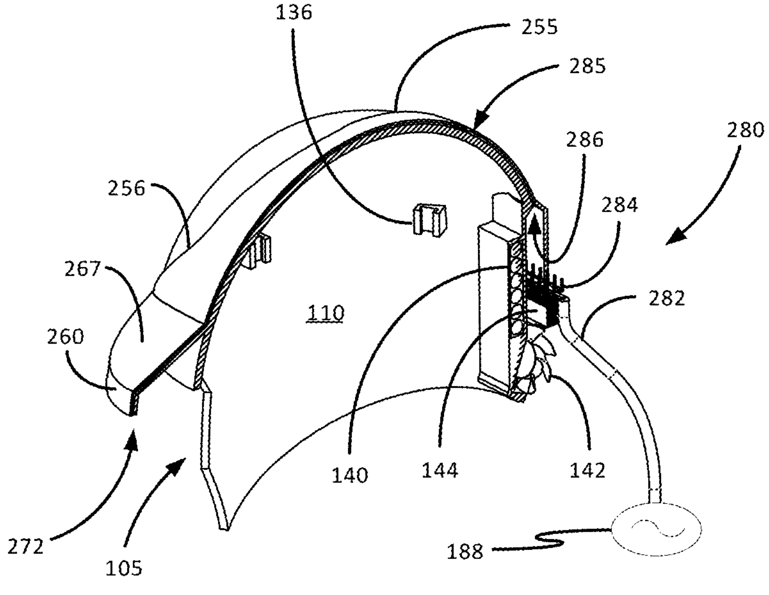
Figure 3E:
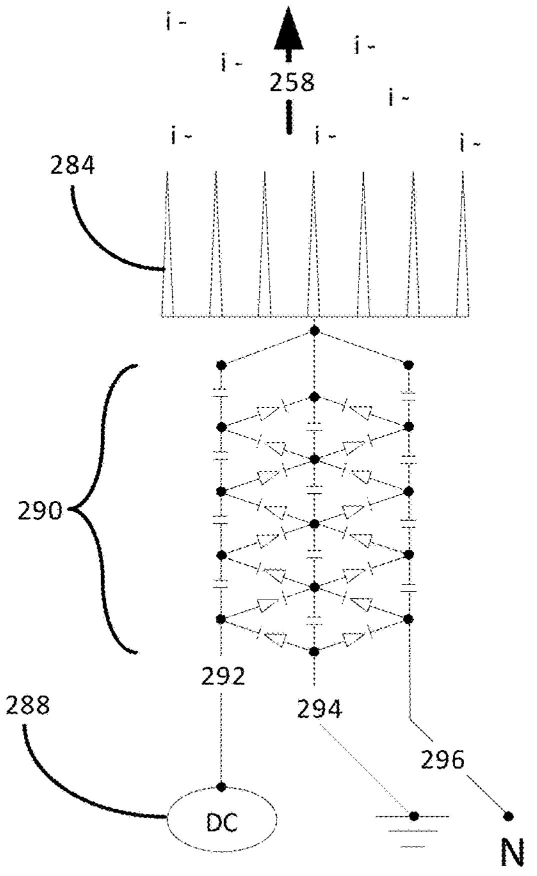
FIG. 3E is a block diagram of an exemplary voltage boosting circuit consistent with embodiments of the present invention.

FIG. 3D is an isometric cross-section view of the helmet 250 consistent with embodiments of the present invention. In this figure, the ionizer arrangement 280 is shown in greater detail. In one embodiment, as depicted by the exemplary power boosting circuit block diagram of FIG. 3E, the ionizer arrangement 280 generally comprises a voltage source 288, that produces direct current, connected to a voltage boosting circuit 290. If alternating current is used, the circuit can include a wave rectifier to convert the alternating current into direct current. The voltage boosting circuit 290, which is a (high voltage) voltage multiplier array, comprises a plurality of diodes each connected to capacitor in an interconnected chain, as shown. It should be appreciated that other ion generating circuits can be arranged by those skilled in the art. The left lead 292 extends from the voltage source 288, the center lead 294 is grounded and the right lead 296 is neutral. The voltage boosting circuit 290 is connected to an ionizer tip array 284, wherein when the voltage boosting circuit 290 is energized, ions 258 emit from the tips (free ends of the needles) of the tip array 284. The tip array can be metal, carbon, or some other conducting material and can be pins, needles, brushes, etc. The fan 142 blows the ions 258 towards the ion duct funnel/inlet port 286, which funnels the ions 258 down the ion duct 285 in the ion conduit 255. The ion duct 285 extends to the ion exit port 272. Hence, the ion exit port 272 is in communication with the ion duct funnel 286, meaning there is a contiguous, uninterrupted path between the ion exit port 272 and the ion duct funnel 286.

Figure 3F:
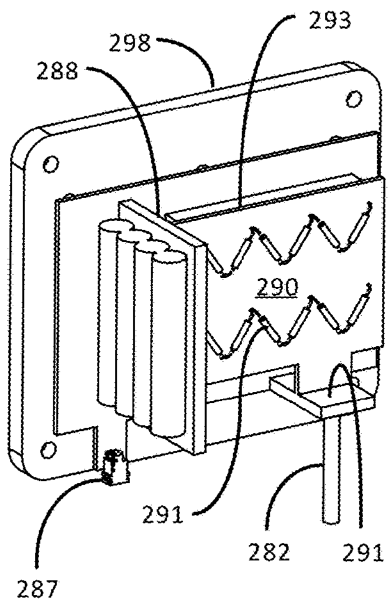
FIG. 3F illustratively depicts a voltage boosting circuit and power supply that can be disposed in a power backpack.
Figure 3G:
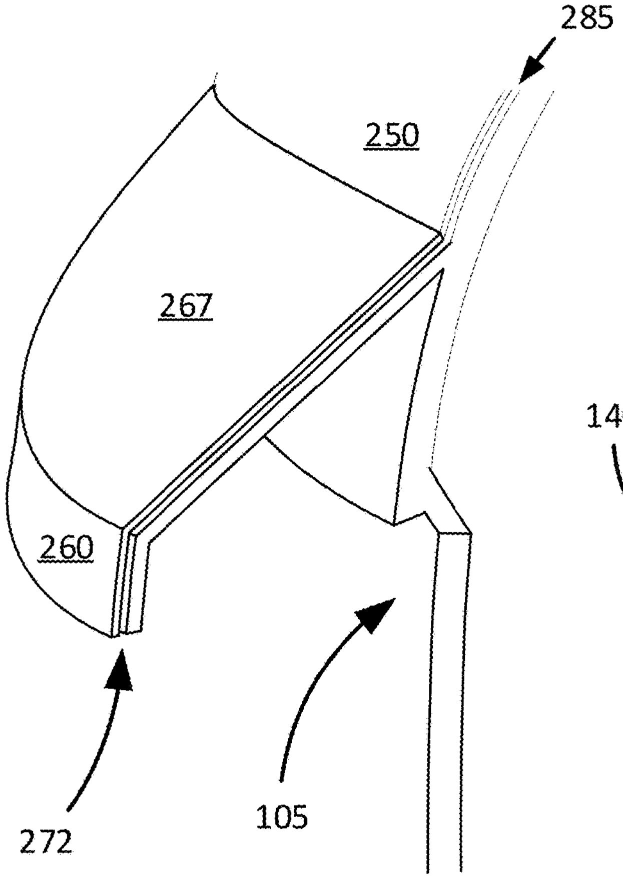
FIGS. 3G and 3H are higher resolution cross-section views of the brim region and the ionizer arrangement of FIG. 3D.
Figure 3H:
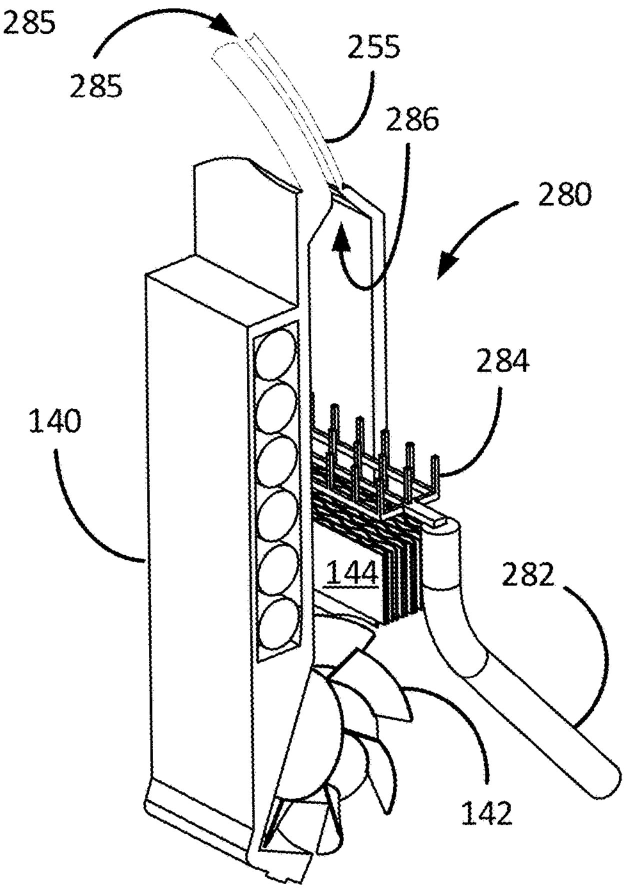
Figure 3I:
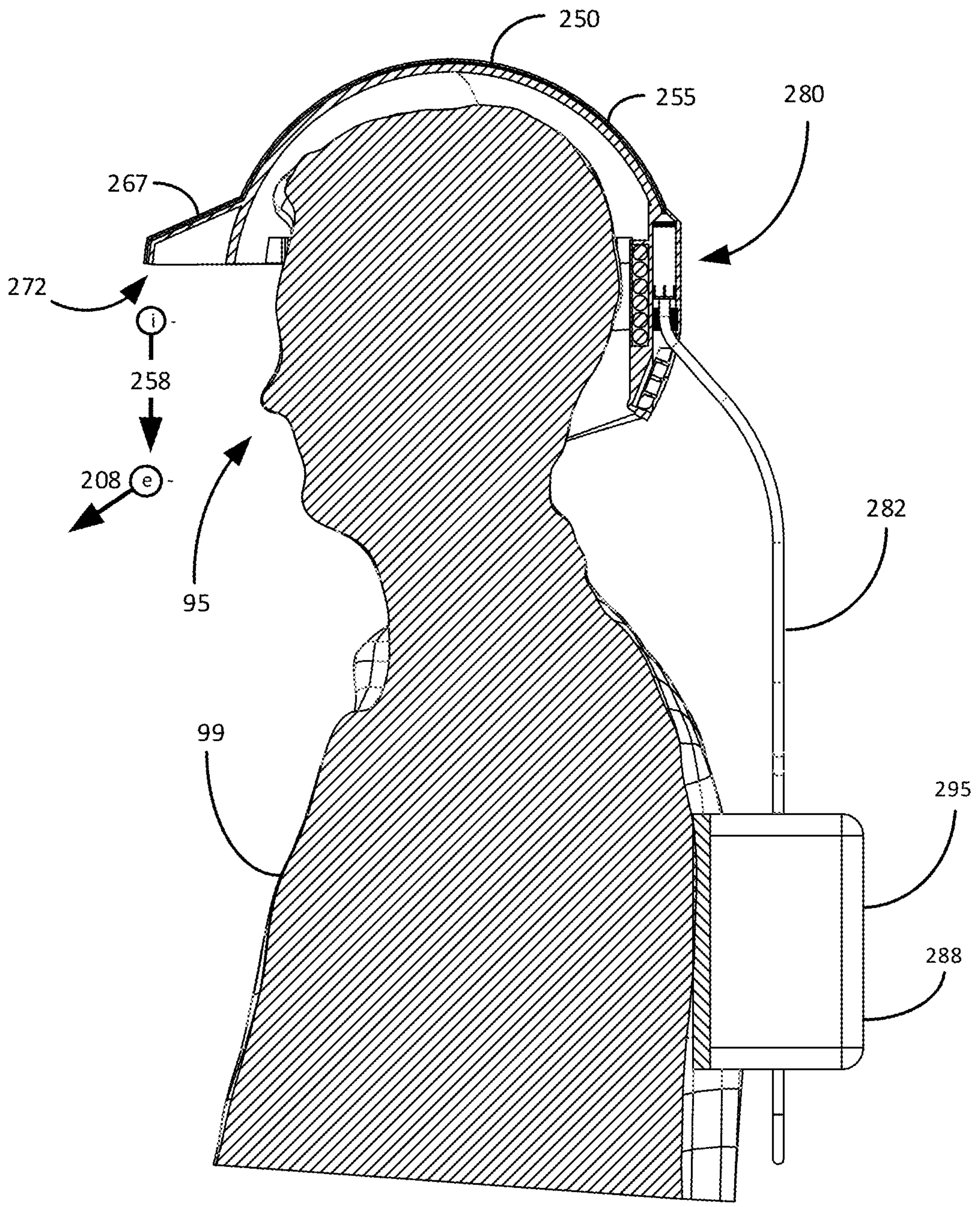
FIG. 3I is a cross-section line drawing of a person wearing the ionizer and with electrostatic face vent barrier helmet.

FIG. 3F illustratively depicts a voltage boosting circuit and power supply that can be disposed in a power backpack 295, as shown in FIG. 3I. As shown, the voltage boosting circuit 290 is mounted on a printed circuit board (PCB) 293, which is mounted to a circuit plate 298, which, in turn, is mounted to the power backpack 295. The diodes 291 are depicted mounted to the PCB 293. The voltage source 288 is a battery arrangement that can be recharged via a connector 287. The voltage boosting circuit 290 is connected to the high voltage power line 282.

FIGS. 3G and 3H are higher resolution cross-section views of the brim region and the ionizer arrangement 280 of FIG. 3D. With reference to FIG. 3H, the ions 258 that are emitted from the ionizer tip array 284 get blown into the ion duct funnel 286 via the fan 142 and down through the ion duct 285 in the ion conduit 255. Shown for reference are the battery pack 140, the filter 144 and the power cable 282. With reference to FIG. 3G, the ions 258 move from the helmet back 252 to the brim 267 where the ions 258 are emitted from the ion exit port 272 (at the bottom of the front periphery 260 of the helmet 250). The face vent 105 is shown here for reference.

FIG. 3I is a cross-section line drawing of a person 99 wearing the ionizer and with electrostatic face vent barrier helmet 250. FIG. 3I is shown in view of FIGS. 2D and 1F. The person 99 is wearing a backpack 295 that includes the voltage source 288 and voltage boosting circuit 290. The voltage conditioned by the voltage boosting circuit 290 is connected to the ionizer arrangement 280 that produces ions 258. When operating, ions 258 are moved through the ion conduit 255 and out the ion exit port 272 in the brim 267. As discussed above, the ions 258 help to charge dust particles 208 floating in the air in front of the wearer's face 95. The charged dust particles 208 are repelled by the electrostatic face vent barrier 215 generated by the electrodes 204 and 206 located along the face vent lip 106. Some embodiments envision the addition of the positive air pressure 135 in the helmet 250, all of which serve to provide essentially a dust free environment within the helmet interior 110 to protect the wearer's respiratory system.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision a particle repelling helmet 200, which can optionally be headgear that is not a helmet but may or may not retain the shape of the helmet, that generally comprises an outer shell 124 with a face vent 105 and particle mitigation system that keeps dust particles from going into the interior of the helmet 200. The outer shell 124 is configured to conform to a substantial part of a wearer's head 98, except for their face 95. The face vent 105 is in the front 104 of the helmet 200 and is defined along boarders that include a forehead lip 116, a left and a right face vent periphery 106. The face vent 105 is configured to provide an unobstructed pathway between an external environment 115 and a wearer's eyes 92, nose 94 and mouth 96. The particle repelling helmet 200 further comprises a spacer arrangement 136, a positive pressure air source 142 and electrodes 204 and 206 disposed at the face vent peripheries 106. The spacer arrangement 136 is connected to an inner side 109 of the particle repelling helmet 200, wherein the spacer arrangement 136 is configured to provide a channel 138 between a wearer's head 98 and the inner side 109. The positive pressure air source 142 is in communication with the channel 138, the positive pressure air source 142 is located at a back side 102 of the particle repelling helmet 200. The positive pressure air source 142 is configured to exit airflow 135 through the face vent 105 via the channel 138. The electrodes 204 and 206 are configured to produce an electrostatic field 215 that spans the face vent 105.

The particle repelling helmet 200 further envisions the electrodes 204 and 206 being connected to an oscillator adapted to generate an oscillating electric field, which is emitted from the electrodes 204 and 206. This can further be where the electrodes 204 and 206 are configured to switch between the oscillating electric field and a non-oscillating electric field.

The particle repelling helmet 250 can further comprise an ionizer 280 that is configured to expel ions 258 that convert dust particles into charged dust particles 208 in a region that is external 115 to the particle repelling helmet 250.

The particle repelling helmet 200 can optionally further comprise a head receiving aperture 108 at a base 107 of the particle repelling helmet 200, wherein the base 107 is opposite a helmet apex 114 of the particle repelling helmet 200. The head receiving aperture 108 is configured to receive a human head 95. This can further include at least one feed channel 138/285 that links to exit ports 122/272 distributed along the brim 117/267, the exit ports 122/272 point in a downward direction 135B defined from the helmet apex 114 towards the head receiving aperture 108. Another embodiment envisions the at least one feed channel 138/285 being in communication with the positive pressure air source 142, wherein the exit ports 122/272 expel the airflow 135B across the face vent 105 in the downward direction.

Some embodiments of the particle repelling helmet 200 further envision a filter 144 in-line with the positive pressure air source 142, wherein the airflow 135 is configured to be filtered upon entering the channel 138.

The particle repelling helmet 200 further envisions the face vent 105 being configured to permit a wearer's hand to enter therethrough to contact the eyes 92, the nose 94 and the mouth 96.

The particle repelling helmet 200 further imagines the spacer arrangement 136 comprising a plurality of compressible stays 136B that is configured to extend from the inner side 109 to the wearer's head 95.

The particle repelling helmet 200 further envisions contemplates the spacer arrangement 136 comprising an adjustable cradle 136A that is configured to conform to the wearer's head 95.

The particle repelling helmet 200 further contemplates the positive pressure air source 142 being a fan located that is at back side 102 of the particle repelling helmet 200, the back side 102 is on the opposite side of the helmet from where the face vent 105 is.

Other embodiments of the present invention contemplate a helmet 200 that is configured to receive a human head 95. The helmet 200 comprising a head interfacing interior 110 and an exterior 111 having a front side 104, a rear side 102, and a perimeter lip 106, 107 and 116, which defines a face vent 105 and a head receiving aperture 108. The head receiving aperture 108 is configured to receive a human head 98. The face vent 105 is defined between a left and a right cheek perimeter lip 106A and 106B of the perimeter lip 106 and a brim 117 that extends from a forehead region 120 of the front side 104. The face vent 105 is configured to provide an unobstructed path between an external environment 115 and a wearer's eyes 92, nose 94 and mouth 96. The helmet 200 further comprises a spacer arrangement 136, a positive pressure air source 142 and electrodes 204 and 206. The spacer arrangement 136 is connected to the helmet inner side 109 and is configured to provide a channel 138 between a wearer's head 95 and the helmet inner side 109. The positive pressure air source 142 is in communication with the channel 138 at the rear side 102. The positive pressure air source 142 is configured to exit airflow 135 through the face vent 105 via the channel 138. The electrodes 204 and 206 are disposed at the left and the right cheek perimeter lip 106A and 106B, wherein the electrodes 204 and 206 are configured to produce an electrostatic field 215 that spans the face vent 105.

The helmet 200 further envisioning the perimeter lip 106, 107 and 116 being configured to extend to a wearer's chin 97.

The helmet 200 further imaging the airflow 135 in the channel 138 being configured to cool the human head 95.

The helmet 200 further contemplating the electrodes 204 and 206 being connected to an oscillator that is adapted to generate an oscillating electric field 215 emitted from the electrodes 204 and 206. This further imagines the electrodes 204 and 206 being configured to switch between the oscillating electric field and a non-oscillating electric field.

The helmet 250 can further comprise an ionizer 280 located at the rear side 102, wherein the ionizer 280 is configured to generate ions 258 that convert dust particles into charged dust particles 208 in an external environment 115 (to the helmet 250).

Yet another embodiment of the present invention envisions a dust repelling helmet 200 that comprises a spacer arrangement 136, a positive pressure air source 142, and electrodes 204 and 206. The dust repelling helmet 200 possesses an inner surface 109 and an exterior surface 111 that defines a front side 104, a rear side 102, and a face vent 105. The face vent 105 is defined between a left perimeter 106A, a right perimeter 106B, and a brim 117 that extends outwardly from a forehead region 120 of the front side 104. The face vent 105 is configured to provide an unobstructed path between an external environment 115 and a wearer's eyes 92, nose 94 and mouth 96. The spacer arrangement 136 is located at the interior 110 and is configured to provide a channel 138 that is defined between a wearer's head 95 and the inner surface 109. The positive pressure air source 142 is envisioned to be in communication with the channel 138 and is configured to flow airflow 135 over the wearer's head 95 and through the face vent 105 via the channel 138. The electrodes 204 and 206 are disposed at the left perimeter 106A and the right perimeter 106B, wherein the electrodes 204 and 206 are configured to produce an electrostatic field 215 that spans the face vent 105.

The dust repelling helmet 250 can further comprise an ionizer 280 located at the rear side 102, wherein the ionizer 280 is configured to generate ions 258 that convert dust particles into charged dust particles 208 in an external environment 115 to the helmet 250.

The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements can vary and can include different geometries not explicitly shown in the embodiments above while maintaining essentially the same functionality without departing from the scope and spirit of the present invention. Likewise, the materials and construction of the helmet/headgear can be different but serve the same purpose without departing from the scope and spirit of the present invention. It should further be appreciated that the circuitry or electrical elements could be different while fulfilling the intended function, the basic construction being understood by those skilled in the art once in possession of the concepts disclosed herein.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A particle repelling helmet comprising:

an outer shell configured to conform to a substantial part of a human head;

a face vent in a helmet front of the particle repelling helmet, the face vent defined along a forehead lip and a left and a right face vent periphery, the face vent configured to provide an unobstructed pathway between an external environment and a wearer's eyes, nose and mouth;

a spacer arrangement connected to an inner side of the particle repelling helmet, the spacer arrangement configured to provide a channel between the wearer's head and the inner side;

a positive pressure air source in communication with the channel, the positive pressure air source located at a back side of the particle repelling helmet, the positive pressure air source configured to exit airflow through the face vent via the channel; and electrodes disposed at the face vent peripheries, the electrodes configured to produce an electrostatic field that spans the face vent.

2. The particle repelling helmet of claim 1, wherein the electrodes are connected to an oscillator adapted to generate an oscillating electric field emitted from the electrodes.

3. The particle repelling helmet of claim 2, wherein the electrodes are configured to switch between the oscillating electric field and a non-oscillating electric field.

4. The particle repelling helmet of claim 1 further comprising an ionizer that is configured to expel ions that convert dust particles into charged dust particles in a region that is external to the particle repelling helmet.

5. The particle repelling helmet of claim 1 further comprising a head receiving aperture at a base of the particle repelling helmet, wherein the base is opposite a helmet apex of the particle repelling helmet, the head receiving aperture configured to receive a human head.

6. The particle repelling helmet of claim 5 wherein the channel links to exit ports distributed along a brim, the exit ports point in a downward direction defined from the helmet apex towards the head receiving aperture.

7. The particle repelling helmet of claim 6, wherein the channel is in communication with the positive pressure air source and the exit ports expel the airflow across the face vent in the downward direction.

8. The particle repelling helmet of claim 1 further comprising a filter in-line with the positive pressure air source, wherein the airflow is configured to be filtered upon entering the channel.

9. The particle repelling helmet of claim 1, wherein the face vent is configured to permit a hand of the wearer to enter therethrough to contact the eyes, the nose and the mouth.

10. The particle repelling helmet of claim 1, wherein the spacer arrangement comprises a plurality of compressible stays configured to extend from the inner side to the wearer's head.

11. The particle repelling helmet of claim 1, wherein the spacer arrangement comprises an adjustable cradle configured to conform to the wearer's head.

12. The particle repelling helmet of claim 1, wherein the positive pressure air source is a fan located at the back side of the particle repelling helmet opposite to the face vent.

13. A helmet configured to receive a human head, the helmet comprising:

a head interfacing interior and an exterior having a front side, a rear side, and a perimeter lip, and defining a face vent and a head receiving aperture, which is configured to receive the human head, the face vent defined between a left and a right cheek perimeter lip and of the perimeter lip and a brim that extends from a forehead region of the front side, the face vent configured to provide an unobstructed path between an external environment and a wearer's eyes, nose and mouth;

a spacer arrangement connected to a helmet inner side, the spacer arrangement configured to provide a channel between the wearer's head and the helmet inner side;

a positive pressure air source in communication with the channel at the rear side, the positive pressure air source configured to exit airflow through the face vent via the channel; and electrodes disposed at the left and the right cheek perimeter lip, wherein the electrodes are configured to produce an electrostatic field that spans the face vent.

14. The helmet of claim 13, wherein the perimeter lip is configured to extend to the wearer's chin.

15. The helmet of claim 13, wherein the airflow in the channel is configured to cool the human head.

16. The helmet of claim 13, wherein the electrodes are connected to an oscillator adapted to generate an oscillating electric field emitted from the electrodes.

17. The helmet of claim 16, wherein the electrodes are configured to switch between the oscillating electric field and a non-oscillating electric field.

18. The helmet of claim 13 further comprising an ionizer located at the rear side, wherein the ionizer is configured to generate ions that convert dust particles into charged dust particles in the external environment to the helmet.

19. A dust repelling helmet comprising:

an inner surface and an exterior surface that defines a front side, a rear side, and a face vent, the face vent defined between a left perimeter, a right perimeter, and a brim that extends outwardly from a forehead region of the front side, the face vent configured to provide an unobstructed path between an external environment and a wearer's eyes, nose and mouth;

a spacer arrangement at an interior, the spacer arrangement configured to provide a channel defined between the wearer's head and the inner surface;

a positive pressure air source in communication with the channel, the positive pressure air source configured to flow airflow over the wearer's head and through the face vent via the channel; and electrodes disposed at the left perimeter and the right perimeter, wherein the electrodes are configured to produce an electrostatic field that spans the face vent.

20. The dust repelling helmet of claim 19 further comprising an ionizer located at the rear side, wherein the ionizer is configured to generate ions that convert dust particles into charged dust particles in the external environment to the helmet.

* * * * *